United States Patent

Ito et al.

[11] Patent Number: 5,247,750
[45] Date of Patent: Sep. 28, 1993

[54] APPARATUS FOR INSPECTING ASSEMBLED CONDITION OF PARTS OF AUTOMOTIVE VEHICLE

[75] Inventors: Takeru Ito, Toyoto; Kiyoshi Yamaoka, Aichi; Isao Okamoto, Toyota, all of Japan

[73] Assignee: Toyota Jidosha Kabushiki Kaisha, Aichi, Japan

[21] Appl. No.: 880,197

[22] Filed: May 8, 1992

[51] Int. Cl.⁵ .......................... G01B 5/24; G01B 5/03
[52] U.S. Cl. ........................................ 33/562; 33/533; 33/608
[58] Field of Search ............... 33/562, 533, 600, 608, 33/645, 288

[56] References Cited

U.S. PATENT DOCUMENTS

| | | | |
|---|---|---|---|
| 2,715,280 | 8/1955 | Kish | 33/562 |
| 3,072,971 | 1/1963 | Kish | 33/562 |
| 4,479,305 | 10/1984 | Wendl et al. | 33/600 |
| 4,558,521 | 12/1985 | Steck et al. | 33/533 |
| 4,630,380 | 12/1986 | Donahue | 33/600 |
| 4,691,443 | 9/1987 | Hamilton | 33/600 |
| 5,029,397 | 7/1991 | Palombi | 33/288 |
| 5,058,286 | 10/1991 | Chisum | 33/608 |

FOREIGN PATENT DOCUMENTS

| | | |
|---|---|---|
| 3-107136 | 11/1991 | Japan. |
| 4-19728 | 2/1992 | Japan. |
| 2241784 | 9/1991 | United Kingdom | 33/645 |

Primary Examiner—William A. Cuchlinski, Jr.
Assistant Examiner—C. W. Fulton
Attorney, Agent, or Firm—Finnegan, Henderson, Farabow, Garrett and Dunner

[57] ABSTRACT

An apparatus for inspecting assembled conditions of interior and exterior parts of an automotive vehicle, comprising an inspection table, two supporting bases mounted on the table, a framework supported by the supporting bases, left and right model jigs shaped to correspond to configurations of left and right side-member final assemblies of the vehicle, and bar members for connecting one model jig with the other. When shaping the model jigs, the supporting bases are used as datum references for the shaping and the framework serves as a core in the model jigs.

5 Claims, 8 Drawing Sheets

APPARATUS FOR INSPECTING ASSEMBLED CONDITION OF PARTS OF AUTOMOTIVE VEHICLE

BACKGROUND OF THE INVENTION

1. Field of the Invention

The present invention relates to an apparatus for inspecting internal and external parts to be assembled for an automotive vehicle, by which an inspection of the assembled condition, such as an installation accuracy, appearance, continuity and so forth of internal and external parts to be installed on the inside or outside of an automotive vehicle can be made.

2. Description of the Related Art

Figure 5:
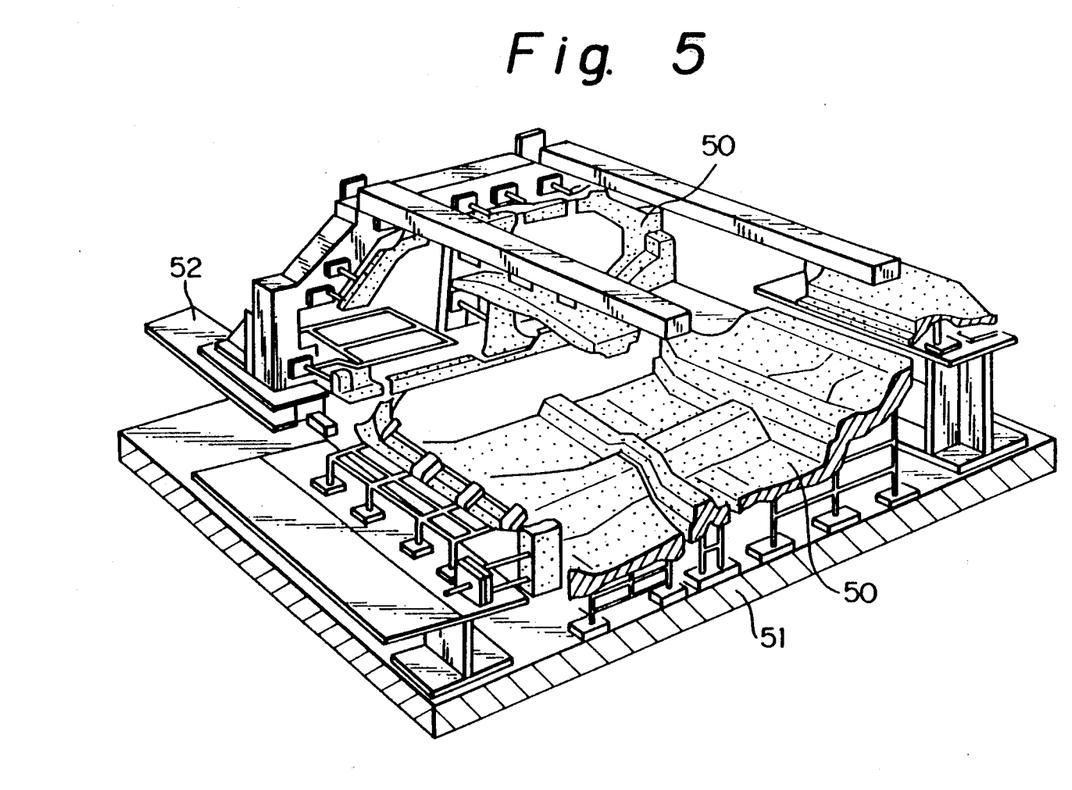
FIG. 5 is an external perspective view of the conventional jig for an inspection of interior parts.

To carry out an inspection of an assembled accuracy of respective interior parts during the process of producing an automotive vehicle, the applicant has already filed an application (Utility Model Application No. 1-144180) for an assembly inspection apparatus as shown in FIG. 5. This apparatus includes model jigs 50 to which the parts are attached, for an inspection of each of the interior parts, are placed on a single inspection jig table 51, to enable an inspection of the configuration, continuity and color matching of all of the interior parts.

Figure 6:
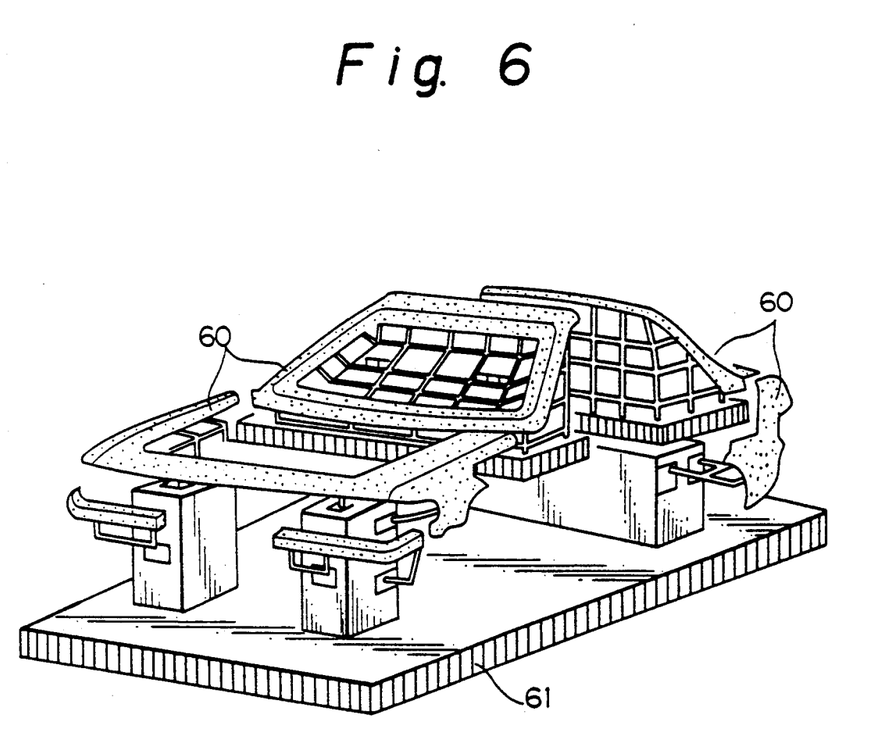
FIG. 6 is an external perspective view of the conventional jig for an inspection of exterior parts.

Furthermore, to determine the assembled accuracy of each of the exterior parts for an automotive vehicle, an assembly inspection apparatus as shown in FIG. 6, which, similar to the foregoing assembling inspection apparatus, has been put to practical use, in which respective assembled exterior parts inspection model jigs 60 are arranged on a single inspection jig table 61, and the inspection is performed by mounting the exterior parts on the model jigs 60.

Namely, the inspections of the assembled conditions of the interior and exterior parts for the interior and exterior of the automotive vehicle currently are performed separately, by using two assembly inspection apparatuses as mentioned above.

The installation of two such assembly inspection apparatuses at a practical inspection site, however, means that a space substantially equal to the size of two automotive vehicles must be occupied, which leads to the problems of an increase of the required inspection space, complications in the inspection operation, and a higher cost for the inspection facility per se.

Accordingly, there is a need to integrate the inspection apparatuses for the interior and exterior parts on a common table, and to reduce the size thereof to thereby make the inspection space as small as possible.

For such an integration, however, the model jigs for inspecting the outer parts on both sides of the vehicle must be placed outside of a side frame 52 (FIG. 5) protruding laterally from a table 51, on which other model jigs for inspecting inner parts are mounted. Therefore, the resulting integrated apparatus becomes longer in a transverse direction of the vehicle, and thus is still too large. Therefore, the integration of the model jig for inspecting the inner side parts and the model jig for inspecting the outer side parts, both of which parts form a boarding and alighting opening of the vehicle, has not, as yet, been realized.

Figure 7:
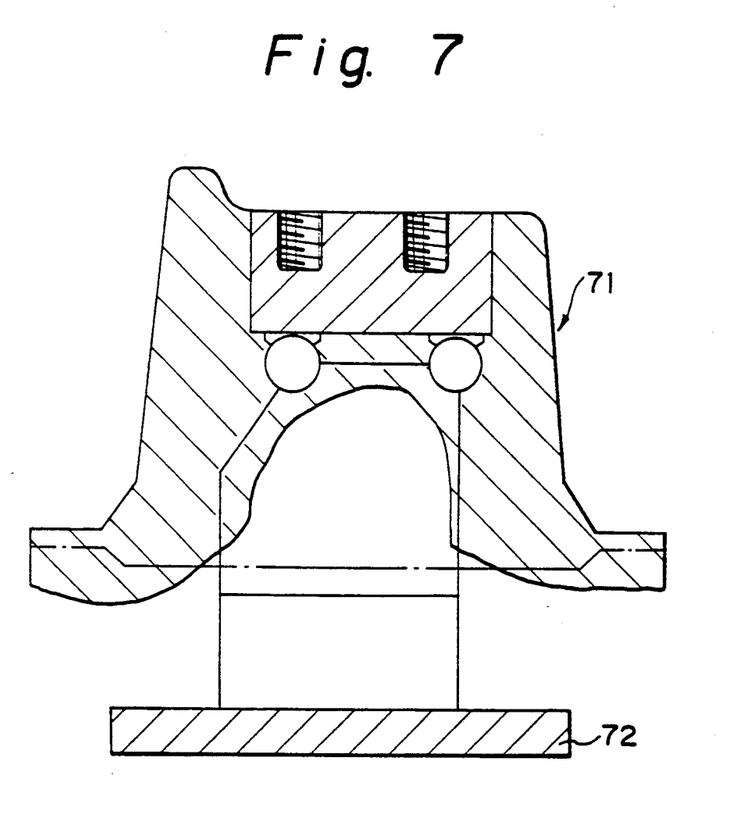
FIG. 7 is a cross section of the conventional jig for inspecting exterior parts, at the center pillar portion corresponding to FIG. 4; and, FIG. 8 shows a cross section of the conventional jig for inspecting interior parts, at the center pillar portion thereof.
Figure 8:
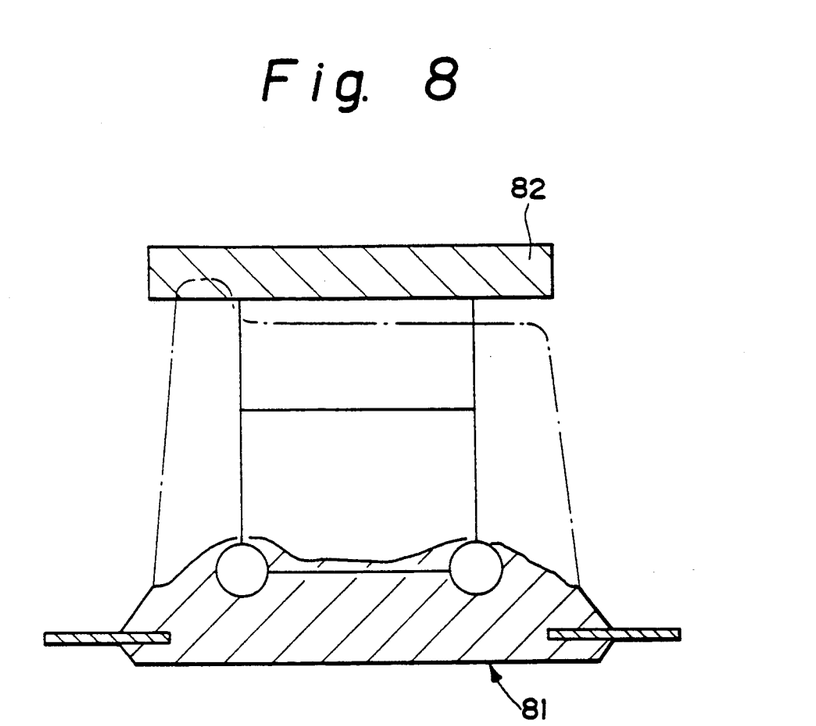

Namely, currently an integrated model jig that will enable an arranging of the inner and outer side parts thereon, with substantially the same distance therebetween as in the actual vehicle, on a common jig table is not known, since it is difficult to obtain a datum reference for shaping the model jigs. Further, even if such an integration is attained, it will require a complicated mechanism for providing a sufficient stiffness of the jigs and for supporting same stably on the table. For example, as shown in FIGS. 7 and 8, in the case of shaping the outer side model jig 71 and the inner side model jig 81 of a center pillar section of the vehicle, model mounting bases 72 and 82 are currently used as datum reference members. Accordingly, a problem arises of how to inspect parts extending over the interior and exterior thereof.

SUMMARY OF THE INVENTION

An object of the present invention is to realize a method of integrating inspection model jigs for the interior parts and exterior parts, to thereby provide an inspection apparatus by which the inspection occupancy space is made smaller, inspection operation is simplified and the cost for the inspection facility is reduced.

Therefore, according to the present invention, there is provided an apparatus for inspecting the assembled conditions of interior and exterior parts to be attached to final assemblies on the left and right sides of an automotive vehicle upon a completion thereof, which assemblies form boarding and alighting openings of the automotive vehicle, the apparatus comprising:

a table on which an inspection can be carried out;

two supporting bases, each mounted on the table so as to face each other in the transverse direction of the automotive vehicle, at positions corresponding to positions of the final assemblies;

a framework supported by the supporting bases;

left and right model jigs which correspond to accurate configurations of the left and right final assemblies, respectively, and which utilize the supporting bases as datum references and use the framework as a core, the interior and exterior parts being attached to the left and right model jigs for an inspection thereof; and bar members extending in a vehicular transverse direction and engaging with both of the model jigs, to thereby maintain a proper distance therebetween.

The two supporting bases on the table serve as datum references for shaping the left and right model jigs. Namely, the framework as the base for the model jigs is established by using the support bases as datum references, and then the configuration of the final assemblies can be shaped. Accordingly, since the two bases conventionally required to mount the model jig on each side can be replaced by the present supporting base, the two model jigs can be integrated, and further, the stiffness of the jigs can be ensured by the framework, since each model jig is supported by the respective supporting base at the lower portion thereof and by the bar member at the upper portion thereof.

The present invention will be more fully understood from the description of the preferred embodiment thereof set forth below, together with the accompanying drawings.

DESCRIPTION OF THE PREFERRED EMBODIMENTS

Figure 1:
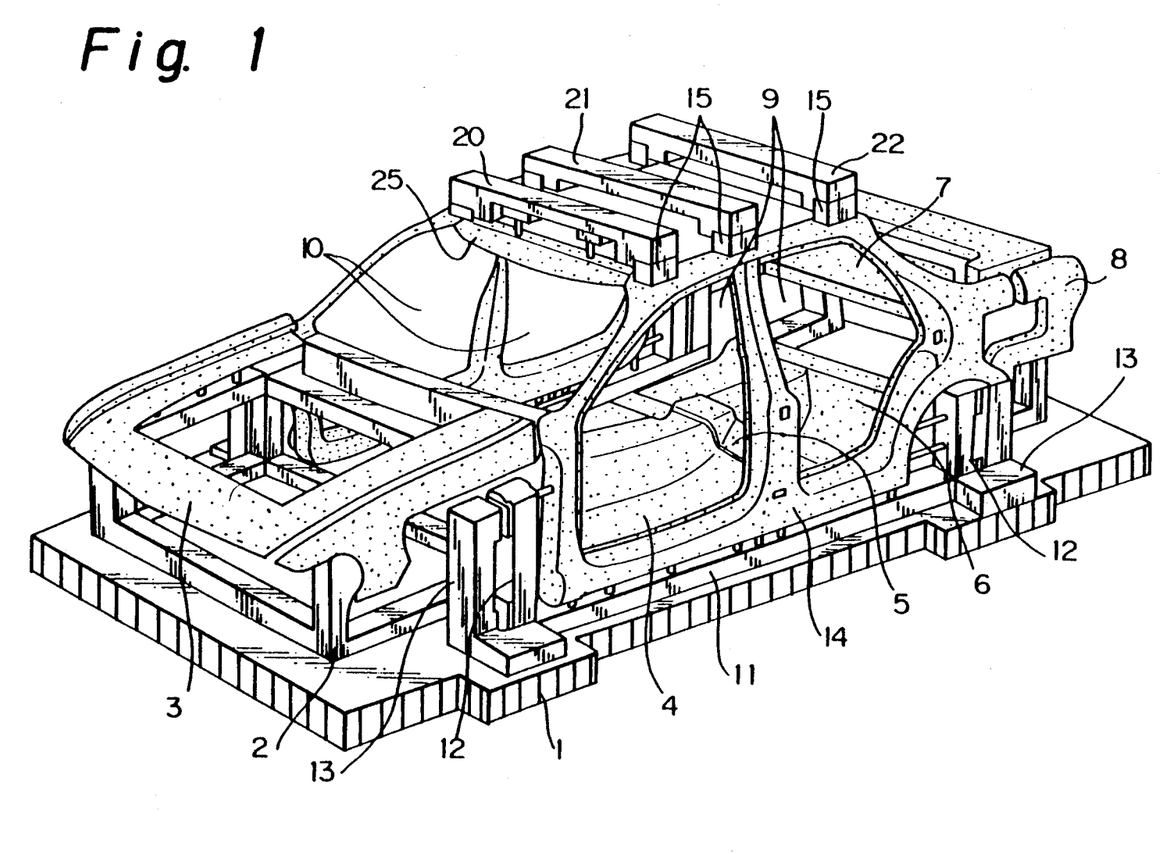
FIG. 1 is an external perspective view of the apparatus according to an embodiment of the present invention.

FIG. 1 shows an apparatus for inspecting interior and exterior parts (not shown) of a vehicle, according to the present invention. As shown in the FIGURE, a frame 2 is arranged to extend from one side of an inspection table 1, which corresponds to the front side of the vehicle, to the other side thereof, which corresponds to the rear side of the vehicle, for mounting model jigs as described later. Mounted on the frame 2, in order from the front side of the table 1, are a front hood/fender model jig 3 used for an inspection of a front hood and fender of the vehicle, a cowl inner model jig (not shown) for inspecting a cowl inner member, a front floor model jig 4 for inspecting a front floor member, a front floor/cross model jig 5 for inspecting a front floor cross member, a rear floor model jig 6 for inspecting a rear floor member, an upper back model jig 7 for inspecting an upper back member and rear quarter model jigs 8 for inspecting rear members to be positioned on both sides of a rear portion of the vehicle. These jigs are fixed at the respective actual relative positional relationships therebetween.

Mounted laterally on the table 1 are supporting bases 11 for supporting model jigs 14 at the lower side thereof, each of which has rectangular parallelpiped shape heel guides 12 at both ends thereof. These supporting bases 11 are positioned at boarding and alighting openings 9 and 10 of the vehicle, to provide temporary datum reference when shaping the model jig 14.

Figure 2:
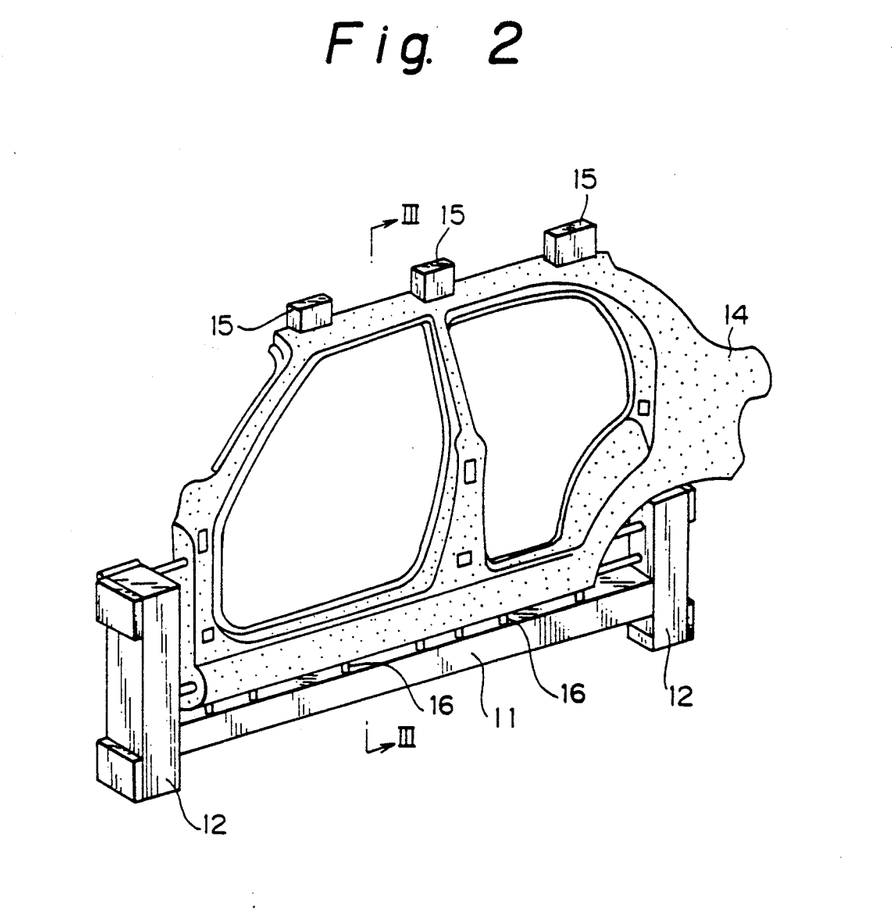
FIG. 2 is an external perspective view of a model jig for inspecting side parts of a vehicle, according to an embodiment of the present invention.

As shown in FIG. 2, the heel guides 12 are fixed to the front and rear ends of the supporting base 11, to support the model jigs 14 in the longitudinal direction, and as shown in FIG. 1, the guides 12 are detachably mounted to upright stands 13 so that the model jig 14 can be replaced with another unit to thereby cope with variations in the types of vehicles.

The method of shaping the model jig 14, and the construction thereof, will be discussed below with reference to FIGS. 2 and 3.

The model jigs 14, as the feature of the invention, are shaped into a predetermined configuration by an NC machine and so forth, utilizing the above-mentioned supporting base 11 as the temporary datum reference. Also, for the shaping of the upper portion of the model jig 14, positioned away from the supporting bars 11, the shaping is performed by taking the blocks 15 (FIG. 2) as the temporary datum reference.

Within the model jig 14, a framework 16 composed of pipes or having a honeycomb construction and so forth, is extended and secured to the support bases 11 and the blocks 15. The framework 16 serves as a core for ensuring a stiffness of the model jig 14.

Figure 4:
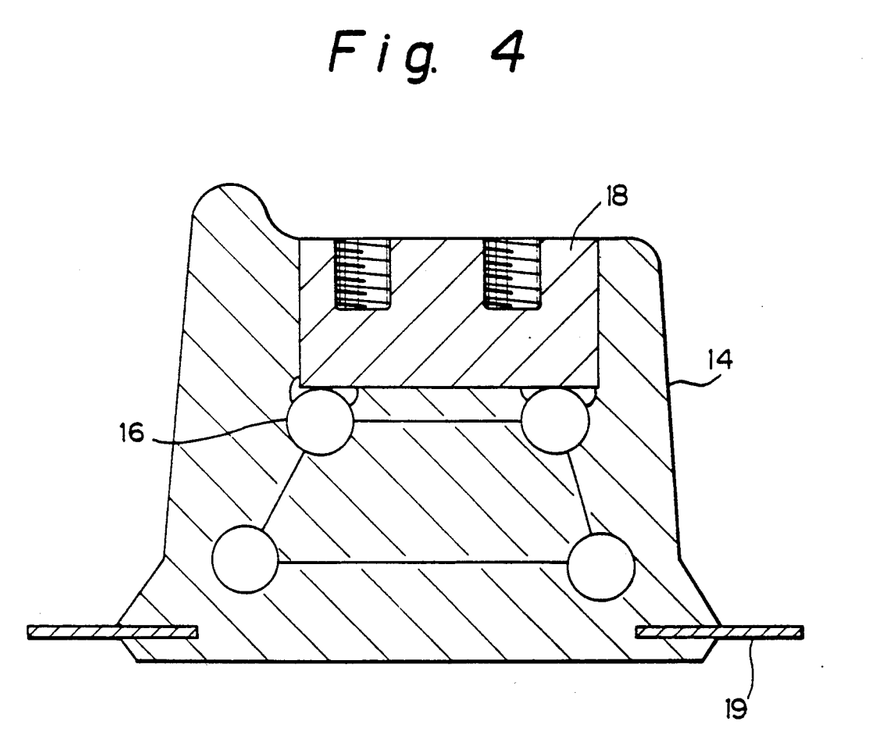
FIG. 4 is a cross section of the jig, taken along the line IV—IV of FIG. 3.

According to this embodiment, since the shaping of the model jig 14 is performed by taking the supporting bases 11 and the blocks 15 as temporary datum references, as represented by the section of the center pillar portion of FIG. 4, the conventional bases 72 and 82 as the datum references for two model jigs (see FIGS. 7 and 8) can be eliminated, and thus the integration of two such model jigs can be attained using the framework 16 extending upward from the supporting bars 11 as the core. Note, in FIG. 4 reference numeral 18 designates a block for mounting a not shown door hinge and 19 denotes a flange of a door opening.

As described above, according to the present invention, by integrating the separate interior and exterior model jigs used in the prior art, it is possible to inspect the interior and exterior parts with a single inspection jig. Note, it is possible to integrally mount a model jig other than the above-mentioned model jigs, as required. Furthermore, due to this construction, it is possible to inspect parts extending between one model jig and another model jig. Also, since other model jigs can be integrated, the installation space required for the inspection jigs can be further reduced.

According to the embodiment shown in FIG. 1, three bars are provided, i.e., a bar 20 for mounting a roof-header inner model jig (not shown), a bar 21 for mounting a roof-center reinforcement model jig 23 (FIG. 3) and a bar 22 for mounting a back-window inner model jig, each having predetermined lengths. These bars 20, 21, and 22 are arranged on the model jigs 14 and engaged with three blocks 15 embedded therein, to thus maintain the required distance between the left and right model jigs 14, i.e., the left and right model jigs 14 are supported at the upper portions thereof by the bars 20, 21, and 22.

Figure 3:
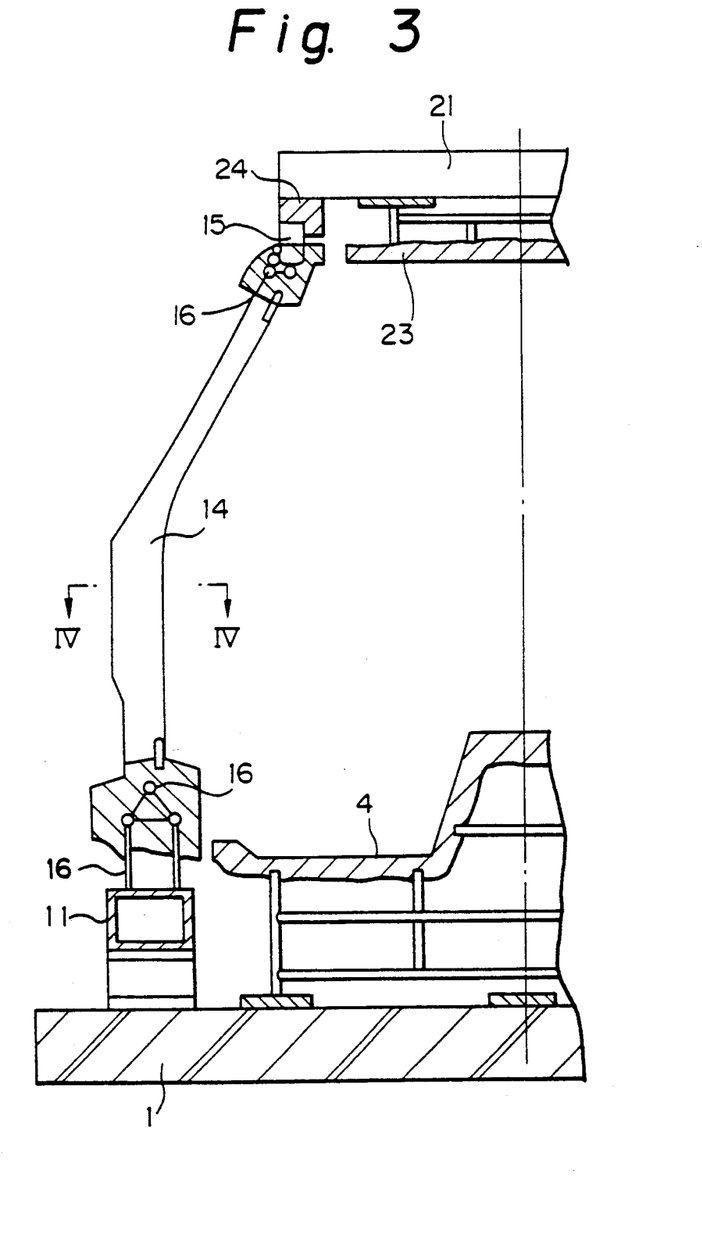
FIG. 3 is a partial longitudinal section of the jig, taken along the line III—III of FIG. 2.

FIG. 3 shows the positional relationship between the model jig 14 and the bar 21. The roof-center reinforcement model jig 23 as an inspection jig for interior parts is mounted beneath the bar 21, and both ends (only one side shown) of the bar 21 are engaged with the blocks 15 embedded in the model jigs 14, through the intermediary of the positioning blocks 24. Note, the blocks 24 are also mounted on respective ends of the remaining bar 20 to which a windshield header model jig 25 is mounted and the bar 22 to which a back window upper model jig (not shown) is mounted.

We claim:

1. An apparatus for inspecting assembled conditions of interior and exterior parts to be attached to final assemblies on left an right sides upon completion of an automotive vehicle, which final assemblies form boarding and alighting openings of an automotive vehicle, said apparatus comprising:

a table on which the inspection can be carried out;

two supporting bases, each detachably mounted on said table so as to face each other in a transverse direction of the automotive vehicle at positions corresponding to the positions of said final assemblies;

a heel guide attached at each opposite end of each of the two supporting bases in the longitudinal direction;

a plurality of upright stands mounted on said table, each said upright stand detachably engaging a respective said heel guide;

a separate framework supported by each of said supporting bases between corresponding heel guides;

left and right model jigs shaped to correspond to accurate configurations of said left and right final assemblies, respectively, and shaped by utilizing said supporting bases as datum references and with using said framework as a core, each said left and right model jig having a lower portion adjacent a corresponding supporting base and an upper portion spaced above the corresponding supporting base whereby said interior and exterior parts are attached to said left and right model jigs during an inspection thereof;

a plurality of blocks attached to each said framework at the upper portion of the respective left and right model jigs; said plurality of blocks serving as temporary datum references during a shaping of the upper portion of corresponding model jigs; and a plurality of bar members each extending in a vehicular transverse direction and engaged with both of said spaced left and right model jigs to thereby maintain a predetermined distance between said jigs.

2. An apparatus according to claim 1, wherein said bar members engage the blocks of corresponding model jigs.

3. An apparatus according to claim 2, wherein said plurality of bar members comprise a frontal bar, an intermediate bar and a rear bar, each of which extends substantially parallel to and spaced from one another.

4. An apparatus according to claim 3, further comprising roof model jigs mounted to said plurality of bar members for inspecting roof-interior parts.

5. An apparatus according to claim 1, further comprising floor-model jigs for inspecting floor-interior parts, positioned between and adjacent the lower portion of said left and right model jigs.

* * * * *

UNITED STATES PATENT AND TRADEMARK OFFICE
CERTIFICATE OF CORRECTION

PATENT NO. : 5,247,750
DATED : September 28, 1993
INVENTOR(S) : Takeru Ito et al.

It is certified that error appears in the above-indentified patent and that said Letters Patent is hereby corrected as shown below:

Title page, Item [75]: Inventor, line 1, change "Toyoto" to --Toyota--.

Signed and Sealed this

Sixteenth Day of August, 1994

Attest:

BRUCE LEHMAN

Attesting Officer

Commissioner of Patents and Trademarks